(12) United States Patent
Tresser

(10) Patent No.: US 6,853,469 B1
(45) Date of Patent: Feb. 8, 2005

(54) METHOD AND SYSTEM FOR DIGITAL PRINTING BY DENSITY SCHEDULING

(75) Inventor: Charles Philippe Tresser, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,473

(22) Filed: May 26, 2000

(51) Int. Cl.[7] .............................................. H04N 1/405
(52) U.S. Cl. ..................... 358/3.06; 358/3.13; 358/3.16
(58) Field of Search ............................... 358/3.06, 3.13, 358/3.14, 3.16, 1.1, 1.8, 535, 536

(56) References Cited

U.S. PATENT DOCUMENTS 5,111,310 A * 5/1992 Parker et al.
5,587,811 A * 12/1996 Liguori ....................... 358/3.2
5,594,809 A * 1/1997 Kopec et al. ................ 382/161
5,917,951 A * 6/1999 Thompson et al.
6,025,930 A * 2/2000 Thompson et al.

* cited by examiner

Primary Examiner—Thomas D. Lee
(74) Attorney, Agent, or Firm—Stephen C. Kaufman; McGinn & Gibb, PLLC

(57) ABSTRACT

A method (and system) of printing, includes forming a matrix of pixels, determining an order of printing of the pixels, the determining including finding a weight of the pixels and printing a pixel having a highest weight, and reordering the remaining pixels and printing a pixel having the greatest weight of the remaining pixels until all pixels have been printed.

44 Claims, 4 Drawing Sheets

| 1 | 2 | 3 | 4 | 5 | 4 | 3 | 2 | 1 |
|---|---|---|---|---|---|---|---|---|
| 2 | 3 | 4 | 5 | 6 | 5 | 4 | 3 | 2 |
| 3 | 4 | 5 | 6 | 8 | 6 | 5 | 4 | 3 |
| 4 | 5 | 6 | 9 | 12 | 9 | 6 | 5 | 4 |
| 5 | 6 | 8 | 12 | 30 | 12 | 8 | 6 | 5 |
| 4 | 5 | 6 | 9 | 12 | 9 | 6 | 5 | 4 |
| 3 | 4 | 5 | 6 | 8 | 6 | 5 | 4 | 3 |
| 2 | 3 | 4 | 5 | 6 | 5 | 4 | 3 | 2 |
| 1 | 2 | 3 | 4 | 5 | 4 | 3 | 2 | 1 |

FIG.3

METHOD AND SYSTEM FOR DIGITAL PRINTING BY DENSITY SCHEDULING

BACKGROUND OF THE INVENTION

1. Field of the Invention

The present invention generally relates to method and system for digital printing, and more particularly to a method and system for digital printing, mostly addressed at printing images, which exploit better the two-dimensional aspect of images than error diffusion methods, and take much more account of the image than dithering methods.

2. Description of the Related Art

Most printers today can print in only a limited number of colors. Digital half-toning is a technique for printing a picture (or more generally displaying it on some two-dimensional medium) using small dots with a limited number of colors such that it appears to consist of many colors when viewed from a proper distance. For example, a picture of black and white dots can appear to display gray colors when viewed from some distance.

The fastest and most commonly used methods for digital half-toning are dithering algorithms which use threshold arrays (i.e., also called dither matrices or dither masks).

The principle of this conventional method, as illustrated by FIG. 1, is well known. The method allows to associate a matrix N of discrete values at 13 (typically "0" or "1", where "1" means a pixel is printed, and a "0" means nothing is printed) to an image I at 11 using a dithering mask 12 (i.e., a usually smaller matrix of threshold values). Various masks can be devised, according to the needs of precise applications, and several methods to devise masks with good performance have been disclosed (e.g., see U.S. Pat. No. 5,111,310 to Parker et al., U.S. Pat. No. 5,917,951 to Thompson et al., and U.S. Pat. No. 6,025,930 to Thompson et al., each incorporated herein by reference).

However, instead of a dithering mask, one can also use other half-toning algorithms such as an error diffusion algorithm.

Before defining this class of techniques, it is noted that when using dithering, one could treat each pixel at any stage of the process, or treat a lot of the pixels in parallel, as the printing decision at each pixel (i.e., to print or not to print at that place) does not depend of the decision at any other point. In practice, one treats the pixels one-by-one, line-by-line, but this is just a matter of practicality, not a need of the method.

To the contrary, error diffusion is rasterization-dependent. That is, one can choose an order in which the pixels will be dealt with, e.g., line-by-line going down the page, and from left to right on each line. Once this order is chosen, before making a printing decision at pixel (i, j) (i.e., choosing which color(s) will be printed at that pixel, if any), one modifies the input at (i, j) by weighted errors made previously in the neighborhood, and computes a new error as the difference between the modified input and the printing decision.

Dithering masks as well as error diffusion can be easily adapted to use more than two possible outputs per pixel (i.e., several levels of gray instead of just black and white). In such a case, one then speaks of multi-tone printers (with a digital printer then referring to black and white pixels only). Also, all these techniques, can be easily adapted to color printing. That is, both adaptation to multi-tone and to color (i.e., digital or multi-tone color) are well known by one versed in the art of digital printing.

A well-known difficulty associated with dithering for a color image is linked to the fact that shifts on the paper, or the printing guns, may occur between different color components, which is known to create undesirable moiré patterns. This problem is usually corrected by using different masks in the various color planes.

Most of these techniques are reviewed in the book *Digital Halftoning*, MIT Press, Cambridge, Mass. (1987) by R. Ulichney, which is a general reference for digital half-toning in black and white. Regarding color, "Optical Color technology for electronic imaging devices" by Kang, Henry R. (Bellingham, Wash., USA: SPIE Optical, 1997) is a general reference for color digital printing.

Other, more global, and very much more time-consuming, methods have been proposed to perform digital half-toning, such as the use of neural networks or global optimization.

Thus, it is easy to understand why dithering works well for a uniform grey input. To the contrary, one can easily exhibit examples of images whose rendering by digital printing would be arbitrarily bad if using a dithering mask. This is because dithering only considers one pixel at a time. The reasonable results one obtains in practice for a natural image, such as pictures of natural scenes, are linked to the fact that, in general, such pictures are quite smooth. For purposes of the present invention, "smooth" refers to a generally slow variation of the output from a pixel to the neighboring ones. Some poor cases are nevertheless commonly encountered.

Error diffusion avoids this problem to some extent, but suffers from the fact that it is attached to an arbitrary raster choice which by nature, destroys the fundamental 2-dimensional nature of images. More sophisticated methods which aim at global optimization in some sense are very slow.

SUMMARY OF THE INVENTION

In view of the foregoing and other problems, disadvantages, and drawbacks of the conventional methods and structures, an object of the present invention is to provide a method and system which is much faster than the search of global optimum, but which still can deal with the 2-dimensional aspect of the images.

In a first aspect, a method (and system) of digital printing includes forming a sequence of matrices $P_k$ with entries 0 or 1 where a 1 at some entry in some $P_k$ represents that this pixel will be printed at stage k, constructing as sequences of matrices $I_k$ with entries in [0, 1], so that $I_0=I$, determining, when considering all pixels, a next pixel having a largest weight indicating that the next pixel is to be printed first, printing the pixel, and determining for each pixel of the remaining ones of pixels of the plurality of pixels a printing order of the remaining pixels such that subsequent pixels of the remaining ones of pixels of the plurality of pixels having a largest weight among the remaining pixels, are subsequently printed.

In a second aspect, a method (and system) of printing includes forming a matrix of pixels, determining an order of printing of the pixels, the determining including finding a weight of the pixels and printing a pixel having a highest weight, and reordering the remaining pixels and printing a pixel having the greatest weight of the remaining pixels until all pixels have been printed.

Further, a program storage medium is provided for storing program steps of the inventive methods.

With the unique and unobvious features of the present invention, a method and system are provided which are much faster than the search of global optimum, but which still can deal with the 2-dimensional aspect of the images without treating each pixel independently of its neighbors.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows the structure of weights in a neighborhood V(i, j) for a preferred embodiment of the present invention;

DETAILED DESCRIPTION OF A PREFERRED EMBODIMENT OF THE PRESENT INVENTION

Turning to FIGS. 2–5, a detailed description of a preferred embodiment according to the present invention will be described.

Prior to describing the preferred embodiment of the present invention and to make the description more precise, some notations will be introduced. Below, considered in detail is the case of digital printing with black and white dots of greyscale images. Other cases such as multi-tone and color will be discussed later.

The original image will be denoted as the matrix I={I(i, j)}, where $1 \leq i \leq$ Himage and $1 \leq j \leq$ Vimage. Each element I(i, j) of I is a real number between 0 and 1, where 0 means "white" and 1 means "black".

The set of pixels to be printed after half-toning will be encoded in the matrix P={P(i, j)}, where $1 \leq i \leq$ Himage and $1 \leq j \leq$ Vimage (i.e., this notation represents "horizontal" and "vertical" coordinates of the image). Each element P(i, j) of P is either 0 or 1, where again "0" means "white" and "1" means "black". It will be convenient to understand P as obtained from the constant 0 matrix by replacing as many 0s by 1s as needed to represent I.

Given an Himage-by-Vimage matrix M with entries in [0, 1], some neighborhood V(i, j, M) is chosen for each (i, j), whose shape and size may either depend or not depend on (i, j), and a set of weights associated to all pixels in V(i, j, M). Then, W(i, j, M) stands for the weighted average of the elements of M in V(i, j, M).

Then, set GreyTotal=$\Sigma_{i,j} I(i,j)$.

Figure 1:
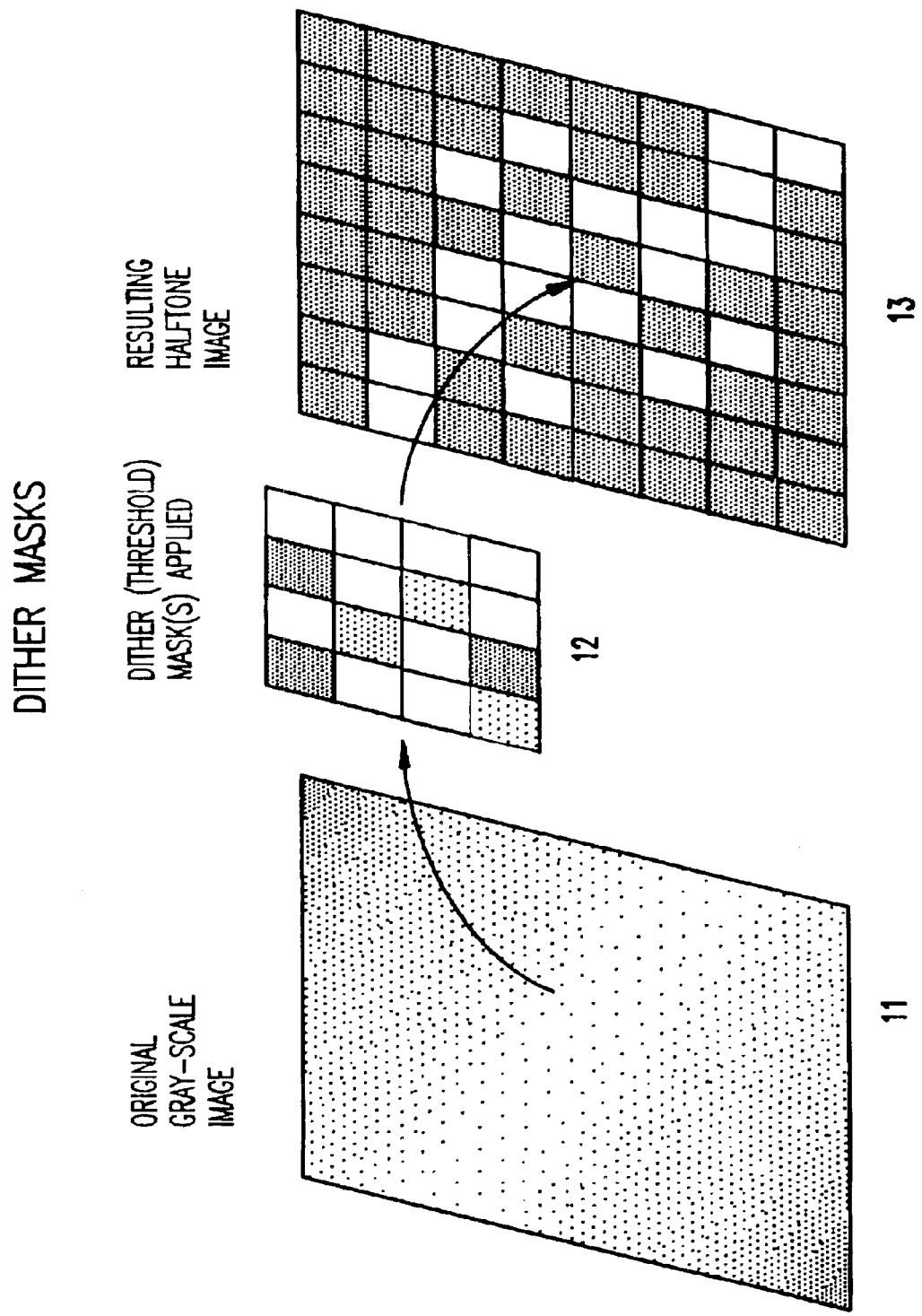
FIG. 1 illustrates the use of dither masks for half-toning, according to conventional methods.
Figure 2:
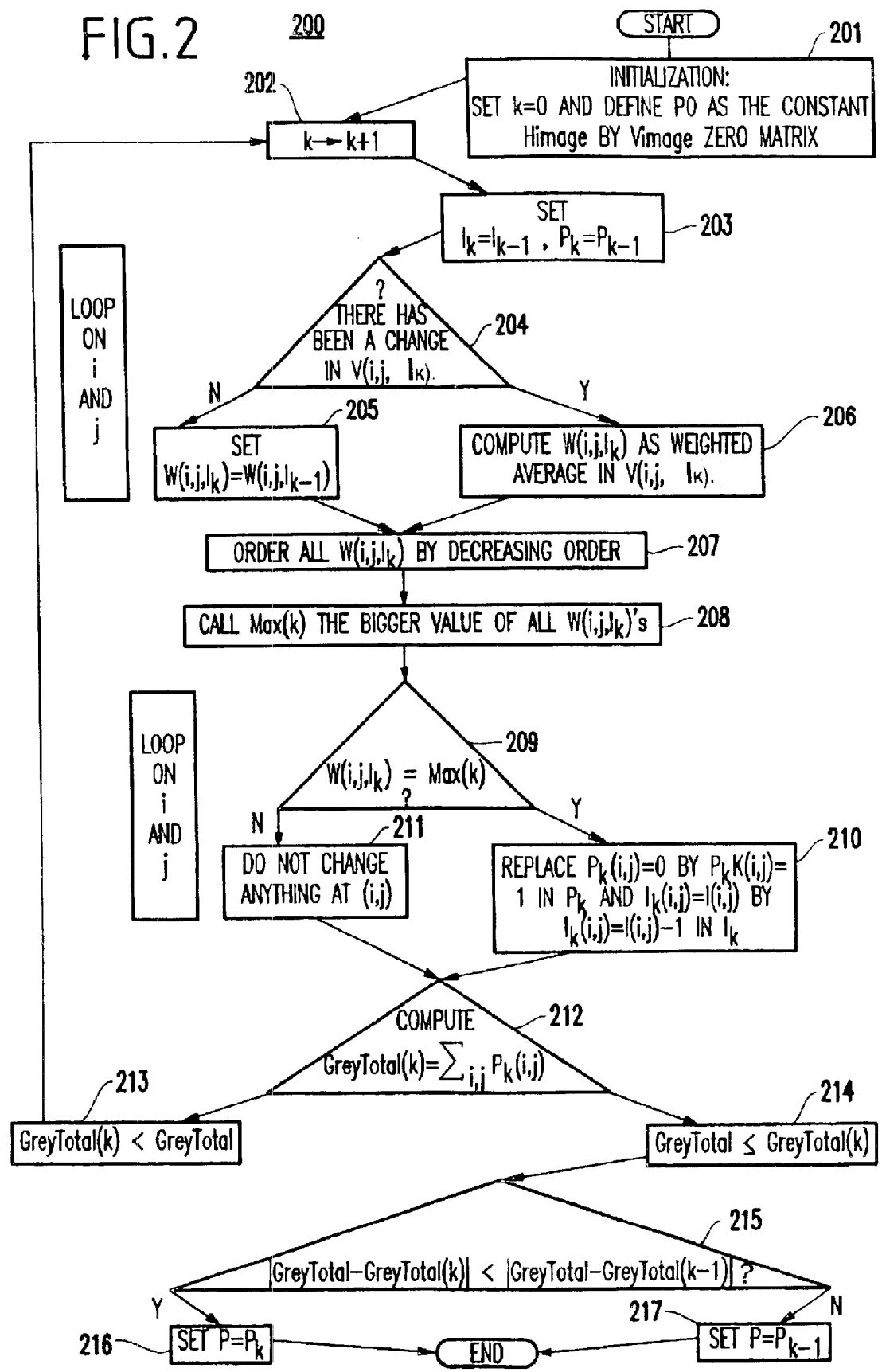
FIG. 2 shows a flow diagram which represents an exemplary method 200 of implementing the present invention.

Hereinbelow and referring to FIG. 2, a method (algorithm) 200 is described which constructs a sequence of matrices $P_k$ with entries 0 or 1, the last one being the matrix P preferably sought by the present invention. In the process, there will be constructed sequences of matrices $I_k$ with entries in [0, 1], so that $O_0$=I.

Initialization:

At step 201, first initialization is performed. That is, set k=0 and define $P_0$ as the constant Himage-by-Vimage zero matrix.

Loop:

In step 202, replace k by k+1 (i.e., as usual in languages such as FORTRAN, k now stands for what would have been k+1 before Step 1) and so forth for each iteration, and in step 203 set $I_k = I_{k-1}$, $P_k = P_{k-1}$.

In step 204, determine whether there has been a change in V(i,j,$I_k$). In steps 205 and 206, compute all W(i,j,$I_k$) (weighted average) not computed so far and set W(i,j,$I_k$)= W(i,j,$I_{k-1}$) if W(i,j,$I_k$) is not computed again (i.e., when k=1, one computes them all, and for k>1, one computes those which have been modified at the previous iteration).

In step 207, order all W(i, j, $I_k$) by decreasing order, and in step 208 call Max(k) the bigger value of all W(i, j, $I_k$)s.

In step 209, it is determined whether W(i, j, $I_k$)=Max(k). For all pairs (i, j) such that W(i,j,$I_k$)=Max(k) (i.e., a YES" in step 209), then in step 210, replace $P_k$(i, j)=0 with $P_k$(i, j)=1 in $P_k$, and $I_k$(i, j)=I(i, j) with $I_k$(i, j)=I(i, j)−1 in $I_k$. If a "NO" results in step 209, then the process loops to step 211 in which nothing at (i, j) is changed.

The process continues to step 212. In step 212, compute GreyTotal(k)=$\Sigma_{i,j} P_k$(i, j). Then, if GreyTotal(k)<GreyTotal as determined in step 213, then the process loops to go to step 202 for the next iteration.

Conversely, if GreyTotal$\leq$GreyTotal(k) as determined in step 214, and |GreyTotal−GreyTotal(k)|<|GreyTotal−GreyTotal(k−1)|as determined in step 215, then in step 216 set P=$P_k$.

Alternatively, if GreyTotal$\leq$GreyTotal(k) as determined in step 214, and |GreyTotal−GreyTotal(k)|$\geq$|GreyTotal−GreyTotal(k−1)|as determined in step 215, then in step 217, set P=$P_{k-1}$. Thereafter, the process ends.

Of course, as would be known by one of ordinary skill in the art taking the present application as a whole, step 202 can easily be modified to vary the total number of black dots being printed, for instance to take account of the actual size of printed dots, compensate for originals which are too clear or too dark, just for a matter of taste, etc.

To apply this method with a multi-tone printer, one prints the lightest grey darker than Max(k) (instead of necessarily a black dot in one bit per pixel printers), and replaces $$I_k(i, j) = I(i, j) - 1$$

by $I_k$(i, j)=I(i, j)—"multibit grey level being printed" in steps 209–211 above.

To apply this method to color images, the image I is decomposed as usual in the color planes accessible to the printer (i.e., Cyan, Magenta, and Yellow, or Cyan, Magenta, Yellow, and Black) and then the method is used, as described above, in each plane. Then, in each color plane, either one bit or multi-tone printing can be accommodated readily.

The invention can further be adapted to accommodate for the fact that some printers (e.g., such as some laser printers) require dark pixels to be grouped together, forming so-called half-tone dots, to compensate for isolated pixels that do not print in a predictable and trustable way.

This accommodation is achieved by making the weights in V(i, j, M) depend also on what is printed at (i, j), for instance to favor printing near a pixel already designed to be printed. For instance, near a pixel already designed to be printed, the sum of the weights in V(i, j) may be greater than one, and otherwise may be smaller than one.

Thus; with the unique and unobvious features of the present invention, the tradeoff between performance and time required is optimized in that the time required by the inventive method, which may be greater than that for the conventional dither etc. techniques, is much smaller than for global optimization and other global methods. Conversely, the performance is much better than for the conventional dither etc. techniques.

Figures 4, 5:
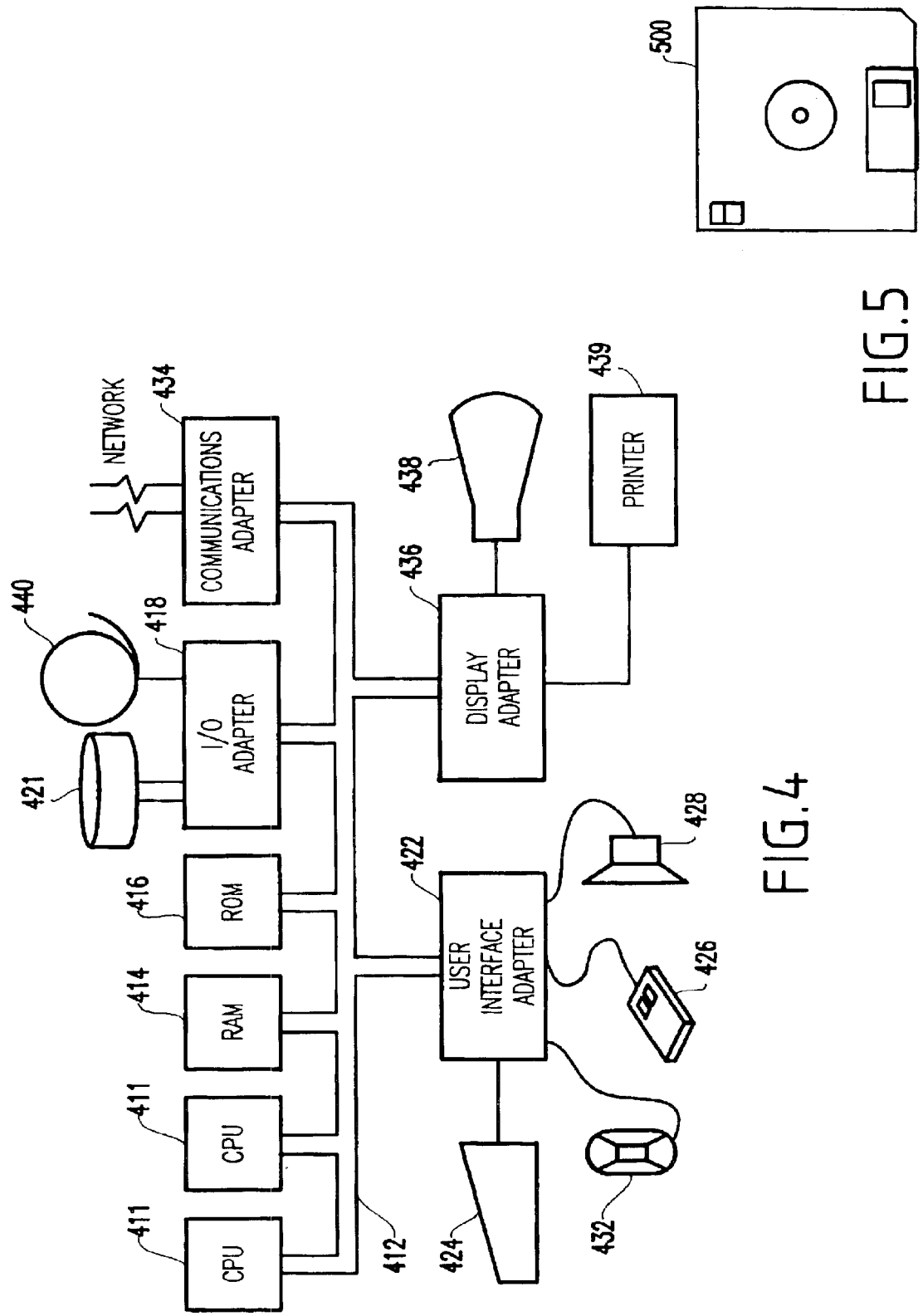
FIG. 4 illustrates an exemplary hardware/information handling system 400 for incorporating the present invention therein.
FIG. 5 illustrates a signal bearing medium 500 (i.e., storage medium) for storing steps of a program of a method according to the present invention.

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439. As mentioned above, the printer 439 may be a digital printer or the like.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 6), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious aspects of the present invention, a method and system are provided in which the tradeoff between performance and time required is optimized in that the time required by the inventive method, which is greater than that for the conventional error diffusion, dithering etc. techniques, is much smaller than for global optimization and other global methods. Conversely, the performance is much better than for the conventional error diffusion, dithering etc. techniques. Indeed, the invention exploits between the two-dimensional aspect of the images than error diffusion methods and takes much more account to the image that dithering methods. Thus, the inventive method and system are much faster than the search of global optimum, but can still cope with the 2-dimensional aspect of the images.

While a preferred embodiment of the present invention has been described above, it should be understood that it has been provided as an example only. Thus, those skilled in the art will recognize that the invention can be practiced with modification within the spirit and scope of the appended claims.

I claim:

1. A method for digital printing represented as a matrix I, comprising:

forming a sequence of matrices $P_k$ with entries 0 or 1 where a 1 at some entry in some $P_k$ represents that this pixel will be printed at stage k;

constructing as sequences of matrices $I_k$ with entries in [0, 1], so that $I_0 = I$;

determining, when considering all pixels in $I_k$ for all successive values of k, a next pixel having a largest weight indicating that said next pixel is to be printed next, so that $P_{k+1}$ differs from $P_k$ by a zero at said next pixel in $P_k$ being replaced by a 1 at the same position in $P_{k+1}$;

printing said pixel;

replacing the value of said pixel in $I_k$ by a 0 thus forming $I_{k+1}$; and incrementing the value of k, until enough pixels have been printed to represent the overall darkness of I by the printed image.

2. The method according to claim 1, wherein with each printing of a pixel, an order of printing of remaining pixels is redefined.

3. The method according to claim 1, further comprising reordering the pixels to be printed with each printing iteration.

4. The method according to claim 1, wherein an original image is denoted as said matrix $I = \{I(i, j)\}$, where $1 \leq i \leq$ Himage and $1 \leq j \leq$ Vimage, where Himage is a number of pixels along a horizontal direction of the image and where Vimage is a number of pixels along a vertical direction of the image, and wherein each element I(i, j) of I is a real number between 0 and 1 where 0 represents "white", 1 represents "black" and intermediate values represent levels of grey.

5. The method according to claim 4, wherein said matrix forming comprises:

setting k=0 and defining $P_0$ as the constant Himage by Vimage zero matrix.

6. The method according to claim 5, further comprising:

with each iteration of redetermining, replacing k by k+1; and setting $I_k = I_{k-1}$ and $P_k = P_{k-1}$ except for a single pixel.

7. The method according to claim 6, further comprising:

determining whether there has been a change in neighborhood $V(i, j, I_k)$ of pixel (i,j) in matrix $I_k$;

computing all weighted averages $W(i, j, I_k)$ of grey values in the neighborhood $V(i,j,I_k)$ of pixel (i,j) in matrix $I_k$ not computed previously and setting $W(i, j, I_k) = W(i, j, I_{k-1})$ if $W(i, j, I_k)$ is not computed again, such that when k=1, all said weighted averages are computed, and for k>1, only said weighted averages which have been modified at a previous iteration are computed.

8. The method according to claim 7, further comprising:

ordering all $W(i, j, I_k)$ by decreasing order; and considering Max(k) as a larger value of all $W(i, j, I_k)$s.

9. The method according to claim 8, further comprising:

determining whether $W(i, j, I_k) = $ Max(k).

10. The method according to claim 9, further comprising:
for all pairs (i, j) such that $W(i, j, I_k)$=Max(k), replacing $P_k(i, j)$=0 with $P_k(i, j)$=1 in $P_k$, and $I_k(i, j)$=$I(i, j)$ with $I_k(i, j)$=$I(i, j)-1$ in $I_k$.

11. The method according to claim 9, further comprising:
computing GreyTotal(k)=$\Sigma_{i,j} P_k(i, j)$.

12. The method according to claim 11, wherein if GreyTotal(k)<GreyTotal, then a next iteration is begun.

13. The method according to claim 11, further comprising:
if GreyTotal≦GreyTotal(k), and |GreyTotal−GreyTotal(k)|<|GreyTotal−GreyTotal(k−1)|, then set $P=P_k$.

14. The method according to claim 11, further comprising:
if GreyTotal≦GreyTotal(k), and |GreyTotal−GreyTotal(k)|≧|GreyTotal−GreyTotal(k−1)|, then set $P=P_{k-1}$.

15. The method according to claim 14, further comprising:
providing a multi-tone printer, such that a lightest grey darker than Max(k) is printed, and $I_k(i, j)$=$I(i, j)-1$ is replaced by $I_k(i, j)$=$I(i, j)$ which represents a multibit grey level being printed.

16. The method according to claim 9, further comprising:
compensating for isolated pixels by making weights in V(i, j, M) depend on what is printed at (i, j).

17. The method according to claim 1, wherein a total number of black dots being printed is variable.

18. The method according to claim 1, further comprising:
encoding the set of pixels to be printed after half-toning, in the matrix P={P(i, j)}, where 1≦i≦Himage and 1≦j≦Vimage, where Himage is a number of pixels along a horizontal direction of the image and where Vimage is a number of pixels along a vertical direction of the image, and
wherein each element P(i,j) of P has a value of either 0 or 1, where "0" represents "white" and "1"represents "black".

19. The method according to claim 18, further comprising:
given a Himage by Vimage matrix M with entries in [0, 1], selecting a neighborhood V(i, j, M) for each (i, j), whose shape and size selectively depends or not on (i, j), and a set of weights associated to all pixels in V(i, j, M).

20. The method according to claim 19, wherein W(i, j, M) represents a weighted average of the elements of M in V(i, j, M), and GreyTotal=$\Sigma_{i,j}$ I(i, j).

21. A method of printing, comprising:
forming a matrix of pixels;
determining an order of printing of said pixels, said determining including finding a weight of said pixels and printing a pixel having a highest weight; and
reordering the remaining pixels and printing a pixel having the greatest weight of the remaining pixels until all pixels have been printed;
wherein the pixels are printed in turn based on the darkness of the local image being printed.

22. A method for digital printing, comprising:
forming a sequence of matrices $P_k$ with entries 0 or 1 where a 1 at some entry in some $P_k$ represents that this pixel will be printed at stage k;
constructing as sequences of matrices $I_k$ with entries in [0, 1], so that $I_0$=I;
determining, for a plurality of pixels in $I_k$ for all successive values of k, a next pixel having a largest weight indicating that said first pixel is to be printed next;
printing said pixel; and
determining for each pixel of the remaining ones of pixels of said plurality of pixels a printing order of said remaining pixels such that subsequent pixels of said remaining ones of pixels of said plurality of pixels having a largest weight among the remaining pixels, are subsequently printed;
wherein the pixels are printed in turn based on the darkness of the local image being printed.

23. A system for printing, comprising:
means for forming a matrix of pixels;
means for determining an order of printing of said pixels, said determining including finding a weight of said pixels and printing a pixel having a highest weight; and
means for reordering the remaining pixels and printing a pixel having the greatest weight of the remaining pixels until all pixels have been printed;
wherein the pixels are printed in turn based on the darkness of the local image being printed.

24. The system according to claim 23, wherein with each printing of a pixel, an order of printing of remaining pixels is redefined.

25. The system according to claim 23, wherein said reordering means reorders the pixels to be printed with each printing iteration.

26. The system according to claim 23, wherein an original image is denoted as said matrix I={I(i, j)}, where 1≦i≦Himage and 1≦j≦Vimage, where Himage is a number of pixels along a horizontal direction of the image and where Vimage is a number of pixels along a vertical direction of the image, and
wherein each element I(i, j) of I is a real number between 0 and 1 where 0 represents "white", 1 represents "black" and intermediate values represent levels of grey.

27. The system according to claim 26, wherein said matrix forming means includes:
means for setting k=0 and defining $P_0$ as the constant Himage by Vimage zero matrix.

28. The system according to claim 27, further comprising:
with each iteration of redetermining, means for replacing k by k+1; and
means for setting $I_k$=$I_{k-1}$ and $P_k$=$P_{k-1}$ except for a single pixel.

29. The system according to claim 28, further comprising:
means for determining whether there has been a change in neighborhood $V(i, j, I_k)$ of pixel (i,j) in matrix $I_k$; and
means for computing all weighted averages $W(i, j, I_k)$ of grey values in neighborhood $V(i,j,I_k)$ of pixel (i,j) in matrix $I_k$ not computed so far and setting $W(i, j, I_k)$=$W(i, j, I_{k-1})$ if $W(i, j, I_k)$ is not computed again, such that when k=1, all said weighted averages are computed, and for k>1, only said weighted averages which have been modified at a previous iteration are computed.

30. The system according to claim 29, further comprising:
means for ordering all $W(i, j, I_k)$ by decreasing order; and
means for considering Max(k) as a larger value of all $W(i, j, I_k)$s.

31. The system according to claim 30, further comprising:
means for determining whether $W(i, j, I_k)$=Max(k).

32. The system according to claim 31, further comprising:
for all pairs (i, j) such that $W(i, j, I_k)$=Max(k), means for replacing $P_k(i, j)$=0 with $P_k(i, j)$=1 in $P_k$, and $I_k(i, j)$=$I(i, j)$ with $I_k(i, j)$=$I(i, j)-1$ in $I_k$.

33. The system according to claim 31, further comprising:
means for computing GreyTotal(k)=$\Sigma_{i,j}$ $P_k(i, j)$.

34. The system according to claim 33, wherein if GreyTotal(k)<GreyTotal, then a next iteration is begun.

35. The system according to claim 33, further comprising:
if GreyTotal≦GreyTotal(k), and |GreyTotal−GreyTotal(k)1<|GreyTotal−GreyTotal(k−1)|, means for setting $P=P_k$.

36. The system according to claim 33, further comprising:
if GreyTotal≦GreyTotal(k), and |GreyTotal−GreyTotal(k)|≧|GreyTotal−GreyTotal(k−1)|, means for setting $P=P_{k-1}$.

37. The system according to claim 36, further comprising:
a multi-tone printer for printing, such that a lightest grey darker than Max(k) is printed, and $I_k(i, j)=I(i,j)−1$ is replaced by $I_k(i, j)=I(i, j)$ which represents a multibit grey level being printed.

38. The system according to claim 31, further comprising:
means for compensating for isolated pixels by making the weights in V(i, j, M) depend on what is printed at (i, j).

39. The system according to claim 23, wherein a total number of black dots being printed is variable.

40. The system according to claim 23, further comprising:
means for encoding the set of pixels to be printed after half-toning, in the matrix P={P(i, j)}, where 1≦i≦Himage and 1≦j≦Vimage, where Himage is a number of pixels along a horizontal direction of the image and where Vimage is a number of pixels along a vertical direction of the image,
wherein each element P(i,j) of P has a value of either 0 or 1, where "0" represents "white" and "1" represents "black".

41. The system according to claim 40 further comprising:
given a Himage by Vimage matrix M with entries in [0, 1], means for selecting a neighborhood V(i, j, M) for each (i, j), whose shape and size selectively depends or not on (i, j), and a set of weights associated to all pixels in V(i, j, M).

42. The system according to claim 41, wherein W(i, j, M) represents a weighted average of the elements of M in V(i, j, M), and GreyTotal=$\Sigma_{i,j}$ I(i, j).

43. A signal-bearing medium tangibly embodying a program of machine-readable instructions executable by a digital processing apparatus to perform a method of printing, said method comprising:
forming a matrix of pixels;
determining an order of printing of said pixels, said determining including finding a weight of said pixels and printing a pixel having a highest weight; and
reordering the remaining pixels and printing a pixel having the greatest weight of the remaining pixels until all pixels have been printed;
wherein the pixels are printed in turn based on the darkness of the local image being printed.

44. A signal-bearing medium tangibly embodying a program of machine-readable instructions executable by a digital processing apparatus to perform a method of printing, said method comprising:
forming a sequence of matrices $P_k$ with entries 0 or 1 where a 1 at some entry in some $P_k$ means that this pixel will be printed at stage k;
constructing as sequences of matrices $I_k$ with entries in [0, 1], so that $I_0=I$;
determining, when considering all pixels in $I_k$ for all successive values of k, a next pixel having a largest weight indicating that said next pixel is to be printed next, so that $P_{k+1}$ differs from $P_k$ by a zero at said next pixel in $P_k$ being replaced by a 1 at the same position in $P_{k+1}$;
printing said pixel;
replacing the value of said pixel in $I_k$ by a 0 thus forming $I_{k+1}$; and
incrementing the value of k, until enough pixels have been printed to represent the overall darkness of 1 by the printed image.

* * * * *